Patented Jan. 19, 1937

2,068,479

UNITED STATES PATENT OFFICE 2,068,479

POTENTIALLY REACTIVE SYNTHETIC RESIN FILM

Albert Henry Bowen and Theodore Williams Dike, Seattle, Wash., assignors to I. F. Laucks, Inc., Seattle, Wash., a corporation of Washington No Drawing. Application March 14, 1934, Serial No. 715,490

5 Claims. (Cl. 106—22)

This invention relates to the process of making a carrierless film from a urea-formaldehyde condensation product, and more specifically a film for use as an adhesive in hot press gluing.

British Patent No. 318,580 discloses a method for making a film from a urea-formaldehyde condensation product. This film, however, differs materially from the present invention in that the product of British Patent 318,580 is completely condensed and polymerized in the making, thus rendering it inactive to further application of heat and useless as an adhesive.

U. S. Patent No. 1,299,747 discloses a method for making a film from a phenol-formaldehyde condensation product for use as an adhesive, but here again a great difference is shown when compared with the present invention. U. S. Patent No. 1,299,747 utilizes a porous sheet as a carrier for the adhesive. In tests carried out in developing the present invention, it was quite definitely shown that anything which in itself was not an adhesive tended to weaken the bond.

German Patent No. 75,566 makes a disclosure very similar to the one next above and the same criticism applies.

In carrying out the present invention, equipment is used which is well known to those skilled in the photographic materials art and is composed essentially of a smooth, moving surface upon which the film forming material is deposited by any suitable means, the surface continually moving forward to the point where the film is removed by any suitable means.

Our invention comprises film products as hereinafter described combining the vital features of potential activity, self-support and indefinitely long life.

To the accomplishment of the foregoing and related ends, the invention, then comprises the features hereinafter fully described, and particularly pointed out in the claims, the following description setting forth in detail certain illustrative embodiments of the invention, these being indicative however, of but a few of the various ways in which the principle of the invention may be employed.

Preferably we operate with a molecular ratio of up to 0.25 molecule of zinc chloride to 1 molecule of urea, with the formaldehyde ratio between 1.70 and 2.25 molecules, preferably about 2.0 molecules. If the amount of zinc chloride is much less than 2% of the weight of the urea, the effect of the former is very slight. By weight these ratios correspond to 57 parts of zinc chloride, and between 230 and 300, preferably about 275, parts of commercial 37% formalin, to each 100 parts of urea (corresponding to 85 to 111 parts formaldehyde, preferably 102).

The reaction is desirably carried out in aqueous solution, such for instance as when commercial formalin is used to provide the formaldehyde. The other materials are dissolved in the formalin, it being preferable to dissolve the zinc chloride before adding the urea to prevent reaction commencing too soon. The temperature maintained during reaction is important, useful intermediates being obtained by reacting below 212 deg. F., usually considerably below and in some cases close to or at room temperature. Boiling the mixture forms an irreversible gel.

The reaction proceeds by stages. First apparently there is a condensation with the formation of colloidal sols, followed by successive stages involving polymerization indicated by increasing viscosity and decreasing solubility with ultimate development of an irreversible gel, which further polymerization converts to an infusible, insoluble end product. Using purified materials a final product is readily obtained which is transparent, colorless, brilliant and glass-like. Either heat or strongly acid conditions in the presence of moisture promote polymerization toward the final end product. The properties may be influenced by a variety of plasticizers and modifying agent.

Desirable intermediates for use as such or for convenient conversion by a subsequent treatment, are obtained by interrupting or controlling the reaction in such a way that polymerization is stopped at least somewhat before the formation of the irreversible gel takes place. When the proper conditions are observed it is possible to obtain liquid intermediate compounds of exceptional stability. Under still other conditions the intermediate products may be dried to produce stable but potentially reactive materials in solid form, either as films, solid masses or powders.

Our products are distinguished from reaction products of urea and formaldehyde both by containing up to 20% of combined zinc chloride, by the unique properties of the products themselves, by the lower cost of manufacture, and especially by the ease with which solid and liquid intermediates are produced and the unusual stability of the latter.

If more than 57 parts of zinc chloride are used the properties of zinc chloride, particularly its hygroscopic character, are apparent in the dried intermediate products, but if the proportion is reduced to 57 parts or below the hygroscopic character disappears and all the zinc chloride appears to be combined. With 57 parts of zinc chloride we have approximately a 20% content of this salt in the dry product, in which case its hygroscopic character would certainly be manifest if it existed as such. If the zinc chloride split up, a strongly acid condition would result inducing rapid polymerization with the conversion of the fluid to a gel. This does not occur, but on the contrary the zinc chloride has a strong stabilizing effect instead of an accelerating action.

As an example of the process:

Fifty pounds of commercial zinc chloride are dissolved in 275 pounds of 37% commercial formalin. This operation is conveniently performed in a closed-top cylindrical container equipped with a power stirring device. Solution is completed in about five minutes. Considerable heat is developed. As soon as the zinc chloride is dissolved and without waiting for the heat of solution to be dissipated, 100 pounds of agricultural urea are stirred in and the stirring continued for about two minutes until the urea is dissolved and the liquid has begun to heat up. By this method the energy released during the solution of the zinc chloride supplies a good part of the heat required for the solution of the urea and the time required to carry out the whole process is shortened. The liquid is at this point allowed to pass out of the container into a series of pipe coils surrounded by a succession of water baths providing three zones for temperature control of the contents of the pipes. In order to empty the container rapidly it is preferable to provide several duplicate sets of coils and to operate them in parallel. This increases the output and avoids any lack of uniformity due to variation in the amount of reaction which takes place during the interval required to empty the container. The first bath is short and kept at a temperature above 170 deg. F., adjusted so as to quickly bring the temperature of the solution within the pipe to that temperature. The pipe coils are then led through a second bath at 170 deg., the length of coil being such as to hold the material at that temperature for 30 minutes while it is constantly progressing forward. The coils are then led through a cooling bath adjusted to bring the material quickly down to room temperature, whereupon it is discharged into containers for storage. The product of this reaction is a stable, sirupy, nearly clear liquid which can be stored for many months without change. For the manufacture of our film we may take for example, 80 parts of this intermediate liquid condensation product, to which may be added 20 parts of a mixture composed of 94 parts of triethyleneglycol and 6 parts of 85% phosphoric acid. All proportions are given by weight. The resulting product is the film forming material.

This film forming material is then spread on the moving surface of any standard film forming apparatus in sufficient quantity to form the desired thickness of film. Drying of the film may be assisted by blast of warm air if desired. The temperature of such air, however, should not exceed 130° F. for a period longer than 5 minutes, otherwise the reactivity of the resulting product will be impaired.

The film made from this material in the above described manner is potentially active when used as a hot press adhesive in the standard manner. It is operative on plywood of all kinds, such as fir, birch, pine, etc. It is also operative on artificial insulating boards, laminated paper, and other cellulose products. As an example, our film may be used for laminating three-ply fir plywood, using a temperature of approximately 250° F. and a pressing time of 3 minutes, or less in the hot press. The result provides a highly water-resistant bond of great strength.

The dry films of our invention may be stored for many months without showing any signs of deterioration, either in their physical properties or as potentially active adhesives.

Instead of the above named triethyleneglycol, other polyatomic alcohols, as glycols or glycerine may be used or other agent supplying a hydroxyl, and other acids as well as phosphoric acid, may be used, as for example acetic, formic, hydrochloric, sulphuric, nitric, etc. These materials have been used by us with excellent results. The choice of materials may be governed by current prices of materials, expediency, or other reasons, without material impairment of the excellent properties of the films.

The films manufactured as illustrated by the example given above and numerous other examples of which this one is illustrative have the remarkable property of being self-supporting, or carrierless. They do not require to be carried by thin papers or other artificial carriers or supporting means. These films are self-supporting, completely reactive and carry no inert support or structure-strengthening materials.

This application is a continuation-in-part of our application Serial No. 666,930, filed April 19, 1933 now Patent No. 1,992,180.

Other modes of applying the principle of the invention may be employed instead of these herein explained, change being made as regards the details disclosed, provided the features stated in any of the following claims, or the equivalent of such, be employed.

We therefore particularly point out and distinctly claim as our invention:—

1. A self-supporting non-reinforced potentially reactive adhesive film of reaction products of zinc chloride with urea and an aldehyde.

2. A self-supporting non-reinforced potentially reactive adhesive sheet material comprising the reaction products of zinc chloride with urea and formaldehyde.

3. A self-supporting non-reinforced potentially reactive adhesive sheet material comprising the reaction products of zinc chloride with urea and an aldehyde, and a polyhydric alcohol.

4. A self-supporting non-reinforced potentially reactive adhesive sheet material comprising the reaction products of zinc chloride with urea and an aldehyde, triethyleneglycol and phosphoric acid.

5. A self-supporting non-reinforced potentially reactive adhesive sheet material comprising the reaction products of zinc chloride with urea and an aldehyde, about 80 parts, and about 20 parts of a mixture composed of about 94 parts of triethyleneglycol and 6 parts of 85% phosphoric acid.

ALBERT HENRY BOWEN.
THEODORE WILLIAMS DIKE.